Dec. 30, 1930.  W. C. STEVENS  1,787,414
STRIP APPLYING DEVICE FOR TIRE BUILDING MACHINES
Filed Oct. 11, 1926  2 Sheets-Sheet 1
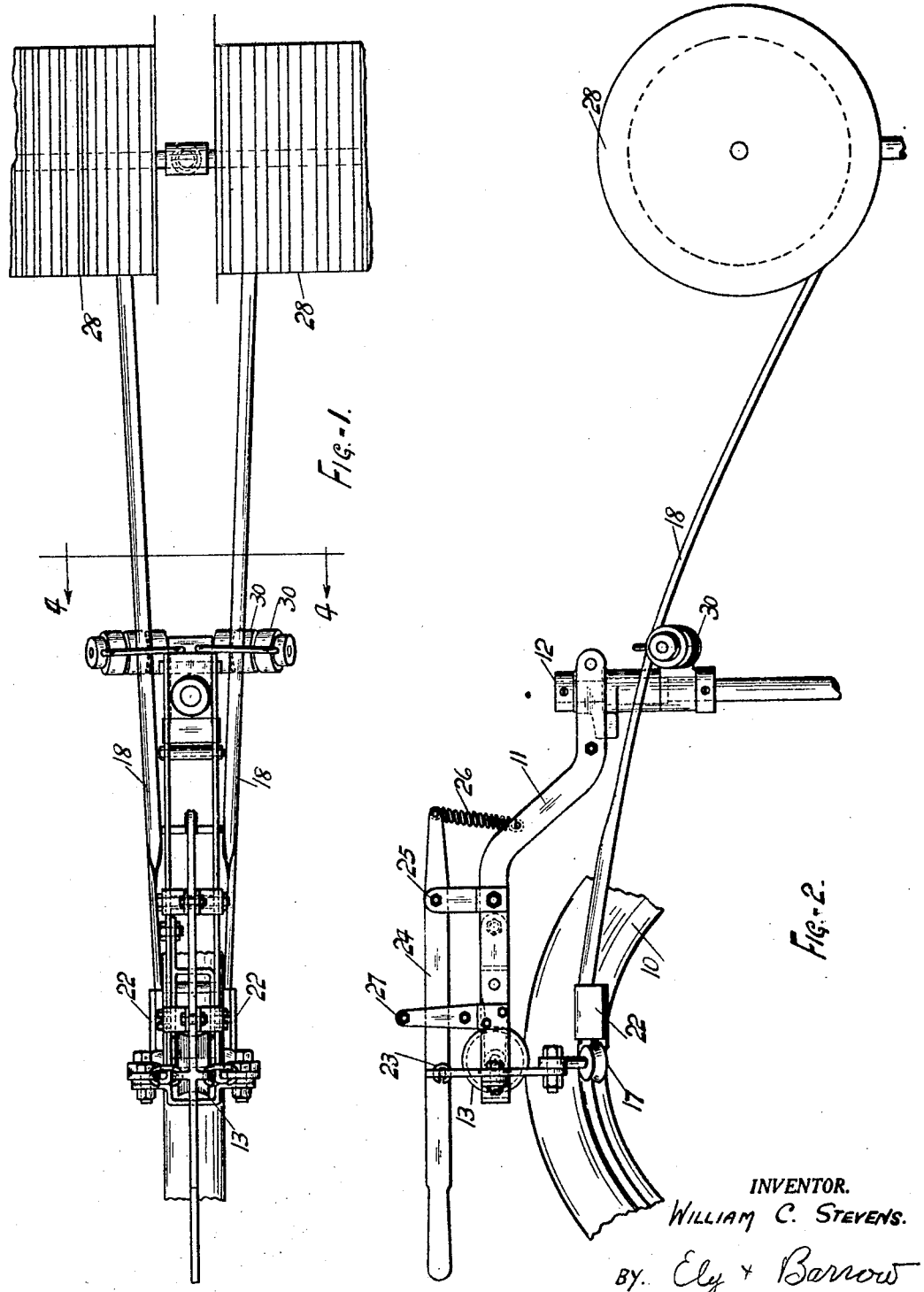
INVENTOR.
WILLIAM C. STEVENS.
BY Ely + Barrow
ATTORNEY.

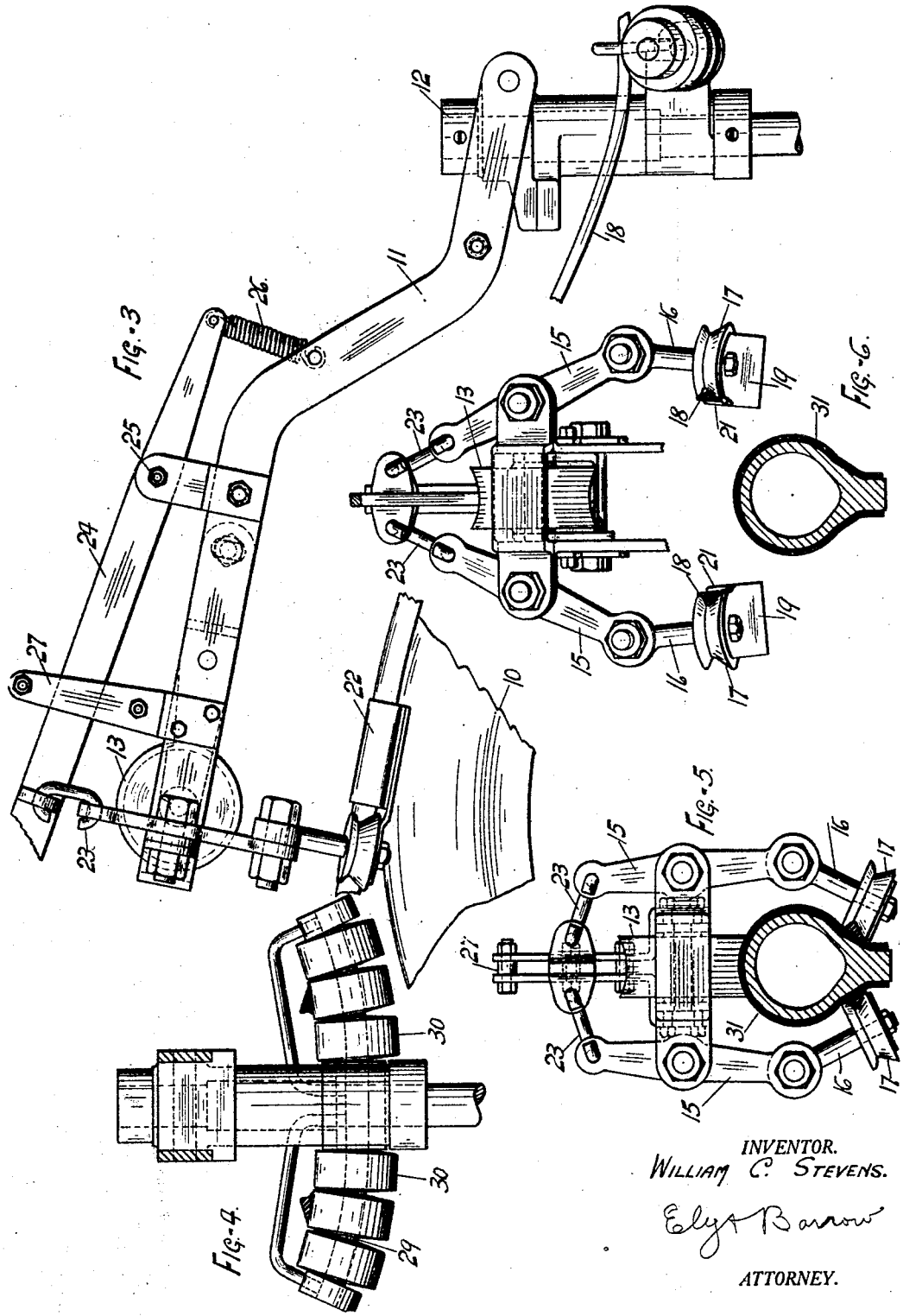

Patented Dec. 30, 1930

1,787,414

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

STRIP-APPLYING DEVICE FOR TIRE-BUILDING MACHINES

Application filed October 11, 1926. Serial No. 140,803.

This invention relates to devices for applying strip material, such as bead material, to partially built rubberized fabric casings upon their building cores or forms.

The general purpose or object of the invention is to provide an improved strip-applying device of the above type and more particularly, the objects of the invention are to provide a device movable toward and from operative relation with the core, strip-applying means on the device, means on the device for effectively positioning the applying means, means on the device for holding the end of the material to be applied in position for ready application to the core, improved means for guiding the strips to the applying means, and a single means for moving the device against the core and for urging the applying means against the core.

The foregoing and other objects are obtained by the device illustrated in the accompanying drawings and described below. It is to be understood that the invention is not limited to the specific form thereof shown and described.

Of the accompanying drawings:

Figure 1 is a plan of apparatus embodying the invention in operative position.

Figure 2 is a side elevation thereof.

Figure 3 is a detail elevation illustrating the device in a position removed from the tire core.

Figure 4 is a detail section on line 4—4 of Figure 1.

Figure 5 is an end elevation of the device in the operating position shown in Figures 1 and 2; and Figure 6 is an end elevation of the device out of operative position as shown in Figure 3.

Referring to the drawings, the numeral 10 indicates a rotatable tire building core mounted for rotation and to be driven in any suitable manner. Operable toward and from core 10 is an arm 11 pivoted on a standard 12 and having a concave positioning roller 13 journaled on its end and adapted to be moved onto the periphery of core 10 for accurately positioning the strip-applying devices to be described.

Pivotally mounted on the opposite sides of arm 11 adjacent the end thereof, are levers 15, 15 having journals 16, 16 thereon secured on the lower ends of levers 15, so as to be angularly adjustable thereon and on which are rotatably mounted bead-strip applying rollers 17, 17. For holding the bead strips indicated at 18, 18 in readiness for application to the core 10, strip guiding devices 19, 19 are attached to journals 16, 16 and provided with strip embracing flanges 21, 21 and 22, 22.

The levers 15 are connected by links 23, 23 to an operating lever 24, pivoted at 25 on arm 11 and normally urged upwardly by a tension spring 26 connected to one end of said lever with arm 11. A stop device 27 is secured on arm 11 for limiting movement of lever 24 thereon.

The supply of bead strips 14 may be effected by provision of reels 28, 28 from which the strips may be led over supporting guides comprising arcuate journals 29, 29 on standard 12, each having a plurality of rollers 30, 30 journaled thereon over which the strips 18 pass.

In operation, after the inner fabric plies 31, 31 have been applied to the core with the bead-applying device out of operative position, the lever 24 is operated so as first to move roller 13 against the periphery of core 10 and then swing applying rollers against the sides of the core to affix the ends of strips 33, 33 thereto. The core is then rotated, drawing the strips from the reeling devices over the guiding device onto the core, the strips being progressively applied about the core, cut to proper length and spliced in the usual way. The device is swung away from the core by the spring when released by the operative.

Modifications of the invention may be resorted to without departing from the spirit thereof or the scope of the appended claims.

What is claimed is:

1. In a tire building machine a device movable toward and from the core, said device including, strip-applying means movable therein against the opposite sides of the core, means for positioning the strip-applying means by engagement with the core, and means for moving the device against the core adapted by continued movement thereof after the positioning means has engaged the core to urge the strip-applying means against the core.

2. In a tire building machine a device movable toward and from the core, said device including, strip-applying means movable therein against the core, means for positioning the strip-applying means by engagement with the core, and means for moving the device against the core adapted by continued movement thereof after the positioning means has engaged the core to urge the strip-applying means against the core.

WILLIAM C. STEVENS.